United States Patent [19]
Wu et al.

[11] Patent Number: 6,051,519
[45] Date of Patent: Apr. 18, 2000

[54] ETHYLBENZENE REDUCTION CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/021,634

[22] Filed: Feb. 10, 1998

[51] Int. Cl.[7] .............. B01J 29/04; B01J 29/06; B01J 21/00; B01J 21/16; C07C 2/52

[52] U.S. Cl. .............. 502/60; 502/64; 502/66; 502/71; 502/74; 502/77; 502/80; 585/419; 208/137

[58] Field of Search .............. 502/60, 64, 66, 502/71, 74, 77, 80

[56] References Cited

U.S. PATENT DOCUMENTS

| | | | |
|---|---|---|---|
| 4,918,256 | 4/1990 | Nemet-Navrodin | 585/415 |
| 5,365,003 | 11/1994 | Chang et al. | 585/470 |
| 5,382,737 | 1/1995 | Beck et al. | 585/475 |
| 5,406,015 | 4/1995 | Beck et al. | 585/475 |
| 5,726,114 | 3/1998 | Chang et al. | 502/64 |
| 5,905,051 | 5/1999 | Wu et al. | 502/60 |

*Primary Examiner*—Tom Dunn
*Assistant Examiner*—Cam N. Nguyen
*Attorney, Agent, or Firm*—Richmond, Hitchcock, Fish & Dollar

[57] ABSTRACT

A catalyst composition and an ethylbenzene isomerization process are disclosed. The composition comprises a silylated zeolite and a promoter comprising a Group VIII metal. The process comprises contacting a fluid which comprises ethylbenzene and at least one xylene with the catalyst composition under a condition sufficient to effect the conversion of ethylbenzene to a xylene. Also disclosed is a process for producing the catalyst composition.

14 Claims, No Drawings

ETHYLBENZENE REDUCTION CATALYST COMPOSITION AND PROCESSES THEREFOR AND THEREWITH

FIELD OF THE INVENTION

This invention relates to a catalyst composition useful in reducing ethylbenzene content in a fluid comprising ethylbenzene and a xylene, to a process for producing the composition, and to a process for using the composition in ethylbenzene conversion.

BACKGROUND OF THE INVENTION

It is well known to those skilled in the art that aromatic hydrocarbons are a class of very important industrial chemicals which find a variety of uses in petrochemical industry. It is also well known to those skilled in the art that catalytically cracking gasoline-range hydrocarbons produces aromatic hydrocarbons such as, for example, benzene, toluene, and xylenes, which are hereinafter collectively referred to as BTX or $C_6$ to $C_8$ aromatic hydrocarbons, in the presence of catalysts which contain a zeolite. The product of this catalytic cracking process contains a multitude of hydrocarbons including unconverted $C_5+$ alkanes, $C_5+$ alkenes, $C_5+$ cycloalkanes, or combinations of two or more thereof; lower alkanes such as methane, ethane, and propane; lower alkenes such as ethylene and propylene; and $C_9+$ aromatic compounds having 9 or more carbon atoms per molecule. Recent efforts to convert gasoline to more valuable petrochemical products have focused on improving the conversion of gasoline to more valuable aromatic hydrocarbons in the presence of zeolite catalysts.

Aromatic hydrocarbons having 8 carbon atoms per molecule which can be derived from the above-described catalytic cracked gasoline, catalytic reformate, pyrolysis gasoline, or combination of two or more thereof generally comprises a mixture of ethylbenzene and xylenes. Among the xylenes, p-xylene is economically most valuable. Ethylbenzene is undesirable because it is less valuable economically than a xylene. Therefore, ethylbenzene must be either physically removed or chemically converted to other more valuable chemicals. However, it is difficult to physically separate ethylbenzene from p-xylene because ethylbenzene and p-xylene have very close boiling points and molecular sizes. An alternative to physical separation of ethylbenzene from p-xylene is chemical conversion of ethylbenzene to xylenes and/or other economically more valuable aromatic products.

Commercial processes for conversion of ethylbenzene, which requires the presence of a xylene, generally either insufficiently convert ethylbenzene to xylenes or do not retain the xylenes in the feed stream or both. Therefore, there is an ever-increasing need to substantially convert ethylbenzene or reduce the content of ethylbenzene and, in the mean time, retain most xylenes in the feed stream.

SUMMARY OF THE INVENTION

An object of this invention is to provide a catalyst composition which can be used in an ethylbenzene conversion process. Also an object of this invention is to provide a process for producing the catalyst composition. Another object of this invention is to provide an ethylbenzene conversion process which can employ the catalyst composition to convert ethylbenzene to benzene, toluene, or a xylene. An advantage of the invention is that the invention process substantially converts ethylbenzene to other more useful aromatic hydrocarbons with a good retention of original xylenes content in the feed. Other objects and advantages will becomes more apparent as this invention is more fully disclosed hereinbelow.

According to a first embodiment of the present invention, a composition which can be used as a catalyst for converting ethylbenzene to benzene, toluene, a xylene, or combinations thereof is provided. The composition comprises, consists essentially of, or consists of, a silylated zeolite having incorporated therein or impregnated thereon a promoter comprising at least one Group VIII metal. The term "Group VIII" refers to CAS version of the Periodic Table of the Elements, CRC Handbook of Chemistry and Physics, 74th edition, 1993–1994, CRC Press, Boca Raton, Fla.

According to a second embodiment of the invention, a process for producing a composition which can be used as catalyst in a hydrocarbon conversion process is provided. The process can comprise, consist essentially of, or consist of: (1) optionally calcining a zeolite to produce a calcined zeolite; (2) combining a zeolite with a binder to produce a zeolite-binder mixture; (4) silylating the zeolite-binder mixture to produce a silylated zeolite; (3) contacting the silylated zeolite with a Group VIII compound, under a condition sufficient to incorporate the Group VIII compound into the zeolite to form a modified zeolite; and (5) heat-treating the modified zeolite under a condition sufficient to effect the production of a heat-treated or promoted zeolite.

According to a third embodiment of the present invention, a process which can be used in an ethylbenzene conversion is provided which comprises, consists essentially of, or consists of, contacting a fluid which comprises ethylbenzene and a xylene, and, optionally, in the presence of an inert fluid, with a catalyst composition which can be the same as disclosed above in the first embodiment of the invention under an ethylbenzene conversion condition effective to convert ethylbenzene to a xylene or to reduce the ethylbenzene content in the fluid.

DETAILED DESCRIPTION OF THE INVENTION

According to the first embodiment of the invention, a composition which can be used as catalyst in an ethylbenzene conversion process is provided. The composition can comprise, consist essentially of, or consist of, a silylated zeolite having incorporated therein, or impregnated thereon, a promoter. The composition is useful for substantially converting ethylbenzene to benzene, toluene, a xylene, or combinations thereof when the composition is used in an ethylbenzene conversion process.

The term "metal" used herein refers to, unless otherwise indicated, both "metal" and "element" of the Periodic Table of the Elements because some elements in the Periodic Table of the Elements may not be considered as metals by those skilled in the art. The term "metal" also refers to a metal compound such as metal oxide.

According to the first embodiment of the invention, the weight ratio of silicon derived from a silylating agent to zeolite can be any ratio so long as the ratio can substantially conversion ethylbenzene to benzene, toluene, a xylene, or combinations thereof. Generally, the ratio can be in the range of from about 0.0001:1 to about 1:1, preferably about 0.0005:1 to about 1:1, more preferably about 0.0005:1 to about 0.5:1 and most preferably from 0.001:1 to 0.1:1 for an effective hydrocarbon conversion. Alternatively, silicon can be present in the catalyst composition in the range of from about 0.01 to about 50, preferably about 0.05 to about 50, more preferably about 0.05 to about 30, and most preferably 0.1 to 10 grams per 100 grams of the catalyst composition.

The term "ethylbenzene conversion" denotes to the conversion of ethylbenzene to benzene, toluene, or a xylene or to the reduction of ethylbenzene content in a fluid containing ethylbenzene. The term "substantially" refers to "more than trivial". The term "xylene retention" denotes the retention of any xylene present in the feed stream. It is presently preferred that the ethylbenzene conversion be at least about 85 weight %, preferably about 90%, and most preferably at least 95%. The xylene retention is at least about 85 weight % and preferably at least about 90%.

Any promoter that, when incorporated into a zeolite, is capable of substantially promoting ethylbenzene conversion can be employed in the invention. Presently, it is preferred that the promoter comprises at least one Group VIII metal. The most preferred Group VIII metal is platinum or an oxide thereof. The oxidation state of the metal can be any available oxidation state. If a combination of metals or metal oxides is employed, the molar ratio of the second metal or metal oxide, or the third metal or metal oxide, or the fourth metal or metal oxide to the first metal or metal oxide can be in the range of about 0.01:1 to about 100:1.

Any commercially available zeolite which can catalyze the conversion of toluene to benzene, a xylene, or combinations thereof can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). Optionally a zeolite can be steam- and/or acid-treated before using the present invention. The presently preferred zeolites are those having medium pore size such as, for example, ZSM-5 zeolite having a framework topology identified as MFI because of its shape selectivity.

The composition of the present invention can be prepared by combining a silylated zeolite, a promoter, and a binder in the weight ratios or percent disclosed above under any conditions sufficient to effect the production of such a composition. However, for the best ethylbenzene conversion and xylenes production, it is preferred that the composition is produced by the process disclosed in the second embodiment of this invention.

According to the first step of the second embodiment of the present invention, a zeolite, preferably ZSM-5 zeolite, and a binder can be well mixed at about 15 to about 100° C. under atmospheric pressure, generally in a liquid such as water or a solvent by any means known to one skilled in the art such as stirring, blending, kneading, or extrusion, following which the resulting mixture can be dried in air at a temperature in the range of from about 20 to about 750° C., for about 0.5 to about 50 hours under any pressures that accommodate the temperatures, preferably under atmospheric pressure. Thereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steaming.

According to the second embodiment of the invention, a zeolite can be contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, diatomaceous earth, and combinations of any two or more thereof; aluminas such as for example α-alumina and γ-alumina; silicas; alumina-silica; aluminum phosphate; aluminum chlorohydrate; and combinations of any two or more thereof. Because these binders are well known to one skilled in the art, description of which is omitted herein. The weight ratio of a zeolite to a binder can be in a wide range and generally in the range of from about 200:1 to about 0.1:1, preferably 100:1 to 0.01:1.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention. The acid can also be a diluted aqueous acid solution. Examples of suitable acids include, but are not limited to, sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations of two or more thereof.

Any methods known to one skilled in the art for treating a solid catalyst with an acid can be used in the acid treatment of the present invention. Generally, a zeolite material, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm) absolute, preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached or -treated before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

A zeolite-binder mixture, obtained in the first step of the process, is then treated with a silylating agent. According to the second embodiment of the present invention, any silylating agents which can modify the acidity of a zeolite or can effect the improvement of ethylbenzene conversion or selectivity to xylenes can be employed.

The contacting or treatment of a zeolite-binder mixture with a silylating agent (silylation process) can be carried out under any suitable conditions known to one skilled in the art. Generally a zeolite can be combined with a silylating agent, in a suitable liquid if needed. The liquid can be water or an organic solvent such as, for example, hydrocarbons, ethers, ketones, esters, amides, or combinations of two or more thereof. The presently preferred liquid is a hydrocarbon such as, for example, cyclohexane.

Generally any silicon-containing compounds which can be converted to a silicon oxide and effective to enhance or improve the ethylbenzene conversion can be used in the present invention. Examples of suitable silicon-containing compounds can have a formula of (R)(R)(R)Si—(—O$_m$Si (R)(R)—)—$_n$R wherein each R can be the same or different and is independently selected from the group consisting of alkyl radicals, alkenyl radicals, aryl radicals, alkaryl radicals, aralkyl radicals, and combinations of any two or more thereof; m is 0 or 1; and n is 1 to about 10 wherein each radical can contain 1 to about 15, preferably 1 to about 10 carbon atoms per radical. Specific examples of such polymers include, but are not limited to, silicon-containing polymers such as poly(phenylmethylsiloxane), poly (phenylethylsiloxane), poly(phenylpropylsiloxane), hexamethyldisiloxane, decamethyltetrasiloxane, diphenyltetramethyldisiloxane, and combinations of any two or more thereof. Other silicon-containing compounds include organosilicates such as, for example, tetraethyl orthosilicate, tetrabutyl orthosilicate, tetrapropyl orthosilicate, or combination of any two or more thereof. A number of well known silylating agents such as trimethylchlorosilane, chloromethyldimethylchlorosilane, N-trimethylsilylimidazole, N,O-bis(trimethylsilyl) acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl) aminopropyl]trimethoxysilane, cyanoethyltrimethoxysilane, aminopropyltriethoxysilane, phenyltrimethoxysilane, (3-chloropropyl)trimethoxysilane, (3-mercaptopropyl) trimethoxysilane, (3-glycidoxypropyl)trimethoxysilane, vinyltris(β-methoxyethoxy)silane, (γ-methacryloxypropyl) trimethoxysilane, vinylbenzyl cationic silane, (4-aminopropyl)triethoxysilane, [γ-(β-aminoethylamino) propyl]trimethoxysilane, (γ-glycidoxypropyl) trimethoxysilane, [β-(3,4-epoxycyclohexyl)ethyl] trimethoxysilane, (β-mercaptoethyl)trimethoxysilane, (γ-chloropropyl)trimethoxysilane, and combinations of two or more thereof can also be employed. The presently preferred silicon-containing compounds are tetraethyl orthosilicate, which is also known as tetraethoxysilane, and poly(phenylmethyl) siloxane.

In the second embodiment of the invention, a silylated zeolite can be combined with a promoter by the process disclosed above for producing zeolite-binder mixture to produce the composition of the invention. The composition can also be produced by contacting a silylated zeolite with a promoter compound, in a solution or suspension, under a condition known to those skilled in the art to incorporate a promoter compound into the silylated zeolite. Because the methods for incorporating or impregnating a promoter compound into a zeolite such as, for example, impregnation by incipient wetness method, are well known to those skilled in the art, the description of which is also omitted herein for the interest of brevity.

According to the second embodiment of the invention, a process for producing a zeolite-containing, preferably a ZSM-5 zeolite-containing, composition comprises, consists essentially of, or consists of: (1) contacting a silylated zeolite with a Group VIII compound under a condition sufficient to incorporate the Group VIII compounds into the silylated zeolite to form a modified zeolite; and (2) heat-treating the modified zeolite under a condition to effect the production of a promoted zeolite.

Generally, in the process of the second embodiment of the invention, a silylated zeolite can be combined with a Group VIII compound in any suitable weight ratios which would result in the weight ratios of a metal to zeolite disclosed in the first embodiment of the invention. Presently it is preferred that such combination be carried out in a suitable liquid, preferably an aqueous medium, to form an incipient wetness zeolite-metal compound mixture. The combining of a silylated zeolite and a Group VIII compound can be carried out at any temperature. Generally, the temperature can be in the range of from about 15° C. to about 100° C., preferably about 20° C. to about 100° C., and most preferably 20° C. to 60° C. under any pressure, preferably atmospheric pressure, for any length so long as the metal compound and the zeolite are well mixed, generally about 1 minute to about 15 hours, preferably about 1 minute to about 5 hours.

Any Group VIII compound can be used in the present invention. The presently preferred Group VIII compound is a ruthenium or platinum compound. Generally, any ruthenium compound that can promote the combination or incorporation of ruthenium element with a zeolite can be used in the invention. Examples of suitable ruthenium compounds include, but are not limited to, ammonium hexachlororuthenate, bis(cyclopentadienyl)ruthenium, chloropentaammineruthenium chloride, hexaammineruthenium chloride, ruthenium acetate, potassium pentachlororuthenate, ruthenium acetylacetonate, ruthenium bromide, ruthenium carbonyl, ruthenium chloride, ruthenium iodide, ruthenium nitrosyl chloride, ruthenium sulfite, and combinations of two or more thereof. The presently preferred ruthenium compound is ruthenium chloride.

Similarly, any platinum compound that can promote the combining of platinum element with a zeolite can be employed herein. Examples of suitable platinum compounds include, but are not limited to, chloroplatinic acid ($H_2PtCl_6 \cdot xH_2O$), platinum chloride (platinic chloride), platinum bromide, platinum iodine, tetramine platinum chloride ($Pt(NH_3)_4Cl_2 \cdot H_2O$ or $Pt(NH_3)_4Cl_2$), tetramine platinum nitrate ($Pt(NH_3)_4(NO_3)_2$), tetramine platinum hydroxide ($Pt(NH_3)_4(OH)_2$), tetrachlorodiamine platinum, and combinations of any two or more thereof. The oxidation state of platinum in the above-illustrated platinum compound can be any available oxidation state. The presently preferred platinum compound is chloroplatinic acid for it is readily available.

Examples of other suitable Group VIII compounds include, but are not limited to, cobalt(II) acetate, cobalt acetylacetonate, cobalt acetylacetonate, cobalt benzoylacetonate, cobalt bromide, cobalt carbonate, cobalt chloride, cobalt 2-ethylhexanoate, cobalt fluoride, cobalt fluoride, cobalt iodide, cobalt iodide, cobalt 2,3-naphthalocyanine, cobalt nitrate, cobalt oxalate, cobalt perchlorate, cobalt phthalocyanine, cobalt sulfate, cobalt thiocyanate, cobalt tungstate, nickel acetate, nickel acetylacetonate, nickel bromide, nickel carbonate, nickel chloride, nickel nitrate, nickel perchlorate, nickel phosphide, nickel sulfate, nickel sulfide, nickel titanate, palladium acetate, palladium acetylacetonate, palladium bromide, palladium iodide, palladium nitrate, palladium sulfate, palladium sulfide, rhodium acetate, rhodium acetylacetonate, rhodium bromide, rhodium chloride, rhodium nitrate, rhodium octanoate, rhodium phosphate, rhodium sulfate, rhenium nitrate, rhenium sulfate, and combinations of any two or more thereof.

Upon completion of incorporating a Group VIII compound into a silylated zeolite, a modified zeolite is formed. In the next step of the process, the modified zeolite is subject to a heat treatment. The heat treatment can be air calcining or steaming. Air calcining can be carried out under a condition sufficient to convert a metal compound to its oxide form and can include a temperature in the range of from about 300° C. to about 1000° C., preferably about 350° C. to about 750° C., and most preferably 400° C. to 650° C. under a pressure in the range of from about 1 to about 10, preferably about 1 atmospheres for a period in the range of from about 1 to about 30, preferably about 1 to about 20, and most preferably 1 to 15 hours.

Steam treatment can be carried out under a suitable condition sufficient to effect the conversion of a Group VIII compound, which has been incorporated into the modified zeolite, to its corresponding oxide form. The modified zeolite can be air dried to remove most moisture content before being steam-treated. Air drying can be carried out at a temperature for about 25° C. to about 150° C. for about 1 minute to about 30 hours under any effective pressure that can maintain the necessary temperature. The air-dried modified zeolite can then be treated with steam. Generally the steam temperature can be in any suitable vessel and in the range of from about 120° C. to about 1500° C., preferably about 200° C. to about 1200° C., and most preferably 250° C. to 1000° C. The treatment period can be as short as 5 minutes to as long as about 30 hours so long as it is sufficient to convert a metal compound to its oxide form. The treatment can be carried out under a pressure which can maintain the required temperature and can be in the range of from about atmospheric pressure to about 2,000, preferably to about 1,500, and most preferably to 1000 psig.

The composition of the invention then can be, if desired, pretreated with a reducing agent before being used in a hydroconversion process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a process useful for converting ethylbenzene to a xylene comprises, consists essentially of, or consists of contacting a fluid stream comprising ethylbenzene and at least one xylene and, optionally in the presence of an inert fluid which is inert to the catalyst, with a catalyst composition under a condition sufficient to effect the conversion of ethylbenzene to a xylene. The inert fluid can be hydrogen, nitrogen, helium, argon, carbon dioxide, neon, steam, and combinations of any two or more thereof. The presently preferred inert fluid is a hydrogen-containing fluid. The inert fluid can also be fed separately into contact with a hydrocarbon and a catalyst. The catalyst composition is the same as that disclosed in the first embodiment of the invention. The term "fluid" is used herein to denote gas, liquid, vapor, or combinations of two or more thereof.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, $CO_2$, steam, or combinations of two or more thereof, or any other fluid which does not significantly affect the process or the catalyst composition used therein.

Any fluid which contains ethylbenzene and a xylene as disclosed above can be used as the feed for the process of this invention. Generally, the fluid feed stream can also contain, in minor amount, olefins, naphthenes (cycloalkanes), or some aromatic compounds.

The contacting of a fluid feed stream comprising ethylbenzene and a xylene with the catalyst composition can be carried out in any technically suitable manner, in a batch or semicontinuous or continuous process, under a condition sufficient effective to convert ethylbenzene to a xylene. Generally, a fluid stream as disclosed above is introduced into a suitable reactor having a fixed catalyst bed, or a moving catalyst bed, or a fluidized catalyst bed, or combinations of two or more thereof by any means known to one skilled in the art such as, for example, pressure, meter pump, and other similar means. Because a hydrocarbon conversion reactor is well known to one skilled in the art, the description of which is omitted herein for the interest of brevity. The condition can include a weight hourly space velocity (WHSV) of the fluid stream in the range of about 0.01 to about 100, preferably about 0.05 to about 50, and most preferably 0.1 to 30 g feed/g catalyst/hour. The gas hourly space velocity can be in the range of from about 0.01 to about 5000 ft³/ft³ catalyst/hour. Generally, the pressure can be in the range of from about 0 to about 1000 psig, preferably about 100 to about 800 psig, and most preferably 100 to 650 psig, and the temperature is about 250 to about 1000° C., preferably about 350 to about 750° C., and most preferably 450 to 650° C.

The process effluent (product) stream generally contains a light gas fraction comprising methane, ethylene, propylene, ethane, propane, non-aromatic compounds having greater than 3 carbon atoms; a BTX aromatic hydrocarbons fraction (benzene, toluene, ortho-xylene, meta-xylene and para-xylene); and a $C_9+$ fraction which contains aromatic compounds having 9 or more carbon atoms per molecule. Generally, the effluent can be separated into these principal fractions by any known methods such as, for example, fractionation distillation. Because the separation methods are well known to one skilled in the art, the description of which is omitted herein. The lights fraction can be fed to an aromatization reactor to be converted to aromatic hydrocarbons; methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to C8 hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), and isomerization of meta-xylene and/or ortho-xylene to para-xylene.

After the catalyst composition has been deactivated by, for example, coke deposition or feed poisons, to an extent that the feed conversion and/or the selectivity to the desired $C_6$–$C_8$ aromatic hydrocarbon(s) have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention using a hydrocarbon feed containing ethylbenzene and xylenes and are not to be construed as unduly limiting the scope of the present invention. The examples illustrate the preparation of catalyst compositions of the invention and the use of the composition in an ethylbenzene isomerization process.

EXAMPLE I

This example illustrates the preparation of catalyst compositions according to this invention and outside the scope of this invention.

Catalyst A was a silica-bound ZSM-5 zeolite. It was prepared as follows: 25 grams of a commercial ZSM-5 zeolite (obtained from Utikon Chemie, Utikon, Switzerland, under the product designation PZ-2/50H) in powder form were mixed with 25 grams of LUDOX® AS-40 colloidal silica (DuPont Company, Wilmington, Del.). The obtained mixture was extruded to make extrudates of about 1/16 inch diameter. These extrudates were dried at 125° C. for 3 hours. The dried extrudates were calcined at 538° C. for 6 hours to produce 27.58 g of catalyst A.

A sample of 17 grams of the calcined silica-bound ZSM-5 zeolite extrudates (catalyst A) was impregnated with 10.27 grams of an aqueous solution containing 1 weight % chloroplatinic acid ($H_2PtCl_6.xH_2O$) in 1 weight % HCl. The thus-impregnated extrudates were then calcined in air at 538° C. for 6 hours to produce 16.65 g of catalyst B. Catalyst B contained 0.234 weight % Pt.

In a separate run, 13.93 g of calcined catalyst B was silylated by mixing with 13.93 g of 10 weight % polymethylphenyl siloxane (PMPS; obtained from Dow Chemical Company, Midland, Mich. under the designation of DOW-510) in cyclohexane at room temperature. The thus-obtained mixture was calcined at 538° C. for 6 hours to produce 14.59 g of silica-bound silylated ZSM-5 (catalyst C). Catalyst C contained 4.52 weight % silicon oxide derived from PMPS and 0.234 weight % Pt.

A portion (10 g) of catalyst A was silylated with 10 g of 10 weight % PMPS in cyclohexane for 3 hours at room temperature to produce a silylated, silicon-bound zeolite. The silylated, silica-bound zeolite was calcined at 538° C. for 6 hours to produce 10.39 g of calcined, silica-bound zeolite. Of the 10.39 g, 3 g was then impregnated with 1.66 g of 1.0 weight % chloroplatinic acid in 1.0 weight % HCL. The Pt-impregnated silylated zeolite was then calcined at 538° C. for 6 hours to produce 2.96 g of catalyst D containing 3.75 weight % silicon oxide derived from PMPS and 0.213 weight % Pt.

Also in a separate run, 25 g of PZ-2/50H ZSM-5 powder was first calcined at 538° C. for 6 hours to produce 24 g of calcined ZSM-5 zeolite which was silylated by mixing with 25 g of 10 weight % PMPS (DOW-510) in cyclohexane at about 25° C. for 4 hours. The silylated ZSM-5, after being dried at room temperature (about 25° C.) for about 16 hours and calcined at 538° C. for 6 hours, was mixed with 25 g of LUDOX® AS-40 to form a paste. The paste was then extruded and the extrudates were calcined at 538° C. for 6 hours to produce 33.53 g of calcined silylated ZSM-5. Thereafter, a portion (3 g) of the calcined silylated zeolite was impregnated with 1.64 g of 1 weight % chloroplatinic acid in 1 weight % HCl followed by calcination at 538° C. for 6 hours to produce 2.93 g of silica-bound, silylated zeolite (catalyst E). Catalyst E contained 3.50 weight % silicon oxide derived from PMPS and 0.213 weight % Pt.

EXAMPLE II

This example illustrates the use of the catalyst compositions described in Example I as catalysts in an ethylbenzene conversion process.

A stainless steel reactor tube (inner diameter: 1 centimeter; length: 60 centimeters) was filled with a bottom layer of 5 ml Alundum® alumina (inert, low surface area alumina), 2.9–3.0 grams of one of the catalysts as the middle layer, and a 5 ml top layer of Alundum® alumina. A liquid feed (density 0.86 g/ml) containing 14.93 weight % ethylbenzene, 45.69 weight % m-xylene, 18.56 weight % o-xylene, 20.40 weight % p-xylene, and 0.42 weight % $C_9+$ aromatic compounds was introduced into the reactor at a rate of about 20.0 ml/hour (weight hourly space velocity about 6.64 g per liter per hour). Hydrogen gas was cofed as carrier gas at a rate such that the molar ratio of $H_2$ to feed hydrocarbon was about 1 and that the reactor pressure was about 170 to about 185 psig. The reactor had been heated to a reaction temperature of about 470° C.

The reactor effluent was separated into a gaseous phase and a liquid phase by passing it through a wet ice trap for liquid product collection and then through a wet test meter for gas volume measurement. The liquid product was analyzed by means of a Hewlett-Packard 5890 gas chromatograph using a HP-PLOT/alumina column. Pertinent test results, obtained after about 7 hours on stream, are summarized in Table I.

TABLE I

| Catalyst Preparation | Si from PMPS | Pt (wt %) | EB[a] Conv (%) | wt % xylenes retained |
|---|---|---|---|---|
| A binder only | None | 0.000 | 84.6 | 67.0 |
| B binder and Pt | None | 0.234 | 100.0 | 63.3 |
| C binder, Pt, and PMPS | 4.52 | 0.234 | 95.3 | 87.4 |
| D binder, PMPS, and Pt | 3.75 | 0.213 | 95.1 | 90.0 |
| E PMPS, binder, and Pt | 3.50 | 0.213 | 98.7 | 80.4 |

[a]EB, ethylbenzene.

The test data in Table I clearly show that a zeolite without impregnation with platinum (catalyst A) had poor ethylbenzene conversion and xylenes retention. When a ZSM-5 zeolite was bound with silica followed by impregnation with platinum (catalyst B), the zeolite improved the conversion of ethylbenzene, but the retention of xylenes was very low. In the case the ZSM-5 was bound with silica, impregnated with platinum, and then silylated with PMPS (catalyst C), both ethylbenzene conversion and xylenes retention improved. Best results were obtained with catalyst D in which the impregnation of platinum was carried out after the silylation of silica-bound zeolite. If the zeolite was silylated first (catalyst E), the xylenes retention was low.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process consisting essentially of: (1) contacting a ZSM-5 zeolite with a binder to produce a zeolite-binder mixture; (2) contacting said zeolite-binder mixture with a silylating agent to produce a silylated zeolite; (3) contacting said silylated zeolite with a Group VIII compound to produce a modified zeolite; and (4) heat-treating said modified zeolite thereby converting said Group VIII compound to corresponding oxide to produce a promoted zeolite.

2. A process according to claim 1 wherein said binder is selected from the group consisting of clay, alumina, silica, and combinations of two or more thereof.

3. A process according to claim 1 wherein said binder is silica.

4. A process according to claim 1 wherein said silylating agent is selected from the group consisting of silicon-containing polymers, organosilicates, and combinations of two or more thereof.

5. A process according to claim 1 wherein said silylating agent is selected from the group consisting of poly (phenylmethylsiloxane), poly(phenylethylsiloxane), poly (phenylpropylsiloxane), hexamethyldisiloxane, decamethyltetrasiloxane, diphenyltetramethyldisiloxane, tetraethyl orthosilicate, tetrabutyl orthosilicate, tetrapropyl orthosilicate, trimethylchlorosilane, chloromethyldimethylchlorosilane, N-trimethylsilylimidazole, N,O-bis(trimethylsilyl) acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl) aminopropyl]trimethoxysilane, cyanoethyltrimethoxysilane, aminopropyltriethoxysilane, phenyltrimethoxysilane, (3-chloropropyl)trimethoxysilane, (3-mercaptopropyl) trimethoxysilane, (3-glycidoxypropyl)trimethoxysilane, vinyltris(β-methoxyethoxy)silane, (γ-methacryloxypropyl) trimethoxysilane, vinylbenzyl cationic silane, (4-aminopropyl)triethoxysilane, [γ-(β-aminoethylamino) propyl]trimethoxysilane, (γ-glycidoxypropyl) trimethoxysilane, [β-(3,4-epoxycyclohexyl)ethyl] trimethoxysilane, (β-mercaptoethyl)trimethoxysilane, (γ-chloropropyl)trimethoxysilane, and combinations of two or more thereof can also be employed.

6. A process according to claim 1 wherein said Group VIII compound is selected from the group consisting of chloroplatinic acid, platinum chloride, platinum bromide, platinum iodine, tetramine platinum chloride, tetramine platinum nitrate, tetramine platinum hydroxide, tetrachlorodiamine platinum, and combinations of any two or more thereof.

7. A process according to claim 1 wherein said Group VIII compound is chloroplatinic acid.

8. A process according to claim 1 wherein said silylating agent is polymethylphenyl siloxane.

9. A process according to claim 8 wherein said Group VIII compound is ruthenium chloride.

10. A process consisting essentially of: (1) combining a ZSM-5 zeolite with a binder to produce a zeolite-binder mixture; (2) contacting said zeolite-binder mixture with a silylating agent to produce a silylated zeolite; (3) contacting said silylated zeolite with a Group VIII compound to produce a modified zeolite; and (4) heat-treating said modified zeolite thereby converting said Group VIII compound to corresponding oxide to produce a promoted zeolite wherein said binder is selected from the group consisting of clay, alumina, silica, and combinations of two or more thereof;

said silylating agent is selected from the group consisting of poly(phenylmethylsiloxane), poly (phenylethylsiloxane), poly(phenylpropylsiloxane), hexamethyldisiloxane, decamethyltetrasiloxane, diphenyltetramethyldisiloxane, tetraethyl orthosilicate, tetrabutyl orthosilicate, tetrapropyl orthosilicate, trimethylchlorosilane, chloromethyldimethylchlorosilane, N-trimethylsilylimidazole, N,O-bis(trimethylsilyl) acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl) trimethoxysilane, [3-(2-aminoethyl)aminopropyl] trimethoxysilane, cyanoethyltrimethoxysilane, aminopropyltriethoxysilane, phenyltrimethoxysilane, (3-chloropropyl)trimethoxysilane, (3-mercaptopropyl) trimethoxysilane, (3-glycidoxypropyl) trimethoxysilane, vinyltris(β-methoxyethoxy)silane, (γ-methacryloxypropyl)trimethoxysilane, vinylbenzyl cationic silane, (4-aminopropyl)triethoxysilane, [γ-(β-aminoethylamino)propyl]trimethoxysilane, (γ-glycidoxypropyl)trimethoxysilane, [β-(3,4-epoxycyclohexyl)ethyl]trimethoxysilane, (β-mercaptoethyl)trimethoxysilane, (γ-chloropropyl) trimethoxysilane, and combinations of two or more thereof can also be employed; and said Group VIII compound is selected from the group consisting of ammonium hexachlororuthenate, bis(cyclopentadienyl)ruthenium, chloropentaammineruthenium chloride, hexaammineruthenium chloride, ruthenium acetate, potassium pentachlororuthenate, ruthenium acetylacetonate, ruthenium bromide, ruthenium carbonyl, ruthenium chloride, ruthenium iodide, ruthenium nitrosyl chloride, ruthenium sulfite, and combinations of two or more thereof.

11. A process according to claim 10 wherein said Group VIII compound is chloroplatinic acid.

12. A process according to claim 10 wherein said silylating agent is polymethylphenyl siloxane.

13. A process according to claim 12 wherein said Group VIII compound is ruthenium chloride.

14. A process according to claim 10 wherein said binder is silica, said Group VIII compound is chloroplatinic acid, and said silylating agent is polymethylphenyl siloxane.

* * * * *